United States Patent
Burton et al.

(10) Patent No.: US 7,482,792 B2
(45) Date of Patent: Jan. 27, 2009

(54) IC WITH FULLY INTEGRATED DC-TO-DC POWER CONVERTER

(75) Inventors: Edward Burton, Hillsboro, OR (US); Peter Hazucha, Beaverton, OR (US); Gerhard Schrom, Hillsboro, OR (US); Rajesh Kumar, Portland, OR (US); Shekhar Y. Borkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 11/152,280

(22) Filed: Jun. 14, 2005

(65) Prior Publication Data

US 2006/0279267 A1    Dec. 14, 2006

(51) Int. Cl.
*G05F 1/59* (2006.01)

(52) U.S. Cl. .................. 323/272; 323/224; 323/282

(58) Field of Classification Search ............. 323/272, 323/224, 282
See application file for complete search history.

(56) References Cited

U.S. PATENT DOCUMENTS

| | | | | |
|---|---|---|---|---|
| 4,588,903 | A * | 5/1986 | Johnson .................. | 326/17 |
| 4,893,227 | A * | 1/1990 | Gallios et al. ............. | 363/26 |
| 6,150,724 | A | 11/2000 | Wenzel et al. | |
| 6,452,247 | B1 * | 9/2002 | Gardner ................... | 257/528 |
| 6,577,535 | B2 * | 6/2003 | Pasternak ............. | 365/185.11 |
| 6,600,296 | B2 | 7/2003 | Hazucha | |
| 6,693,412 | B2 * | 2/2004 | Ruan et al. ............... | 323/282 |
| 6,754,086 | B2 | 6/2004 | Harris et al. | |
| 6,873,136 | B2 * | 3/2005 | Chagny ................... | 320/141 |
| 7,026,797 | B2 * | 4/2006 | McCune, Jr. ............. | 323/225 |
| 7,034,344 | B2 | 4/2006 | Pavier et al. | |
| 7,110,266 | B1 * | 9/2006 | Porter et al. ............. | 363/21.01 |
| 7,202,648 | B2 | 4/2007 | Gardner et al. | |
| 2003/0090255 | A1 * | 5/2003 | Bassett et al. ............ | 323/284 |
| 2003/0128602 | A1 * | 7/2003 | Nishimoto et al. ........ | 365/200 |
| 2003/0168748 | A1 * | 9/2003 | Katagiri et al. ........... | 257/778 |
| 2003/0189460 | A1 | 10/2003 | Wang et al. | |
| 2003/0209809 | A1 * | 11/2003 | Lasky et al. .............. | 257/778 |
| 2004/0124510 | A1 | 7/2004 | Piorun et al. | |
| 2004/0240309 | A1 | 12/2004 | Piorun et al. | |

(Continued)

FOREIGN PATENT DOCUMENTS

EP    1376692 A2    1/2004

(Continued)

OTHER PUBLICATIONS

WIPO 2001003279.*

(Continued)

*Primary Examiner*—Akm E Ullah
*Assistant Examiner*—Harry Behm
(74) *Attorney, Agent, or Firm*—Ryder IP Law; Douglas J. Ryder

(57) ABSTRACT

In general, in one aspect, the disclosure describes a semiconductor device that includes a functional circuit and a dc-to-dc power converter. The power converter converts, regulates, and filters a DC input voltage to produce a DC output voltage and provides the DC output voltage to the functional circuit. The dc-to-dc power converter has an operating frequency above 10 MHz.

12 Claims, 7 Drawing Sheets

U.S. PATENT DOCUMENTS

| | | |
|---|---|---|
| 2006/0006432 A1 | 1/2006 | Shiraishi et al. |
| 2006/0091871 A1* | 5/2006 | Abedinpour et al. ........ 323/283 |
| 2007/0023878 A1 | 2/2007 | Burton |

FOREIGN PATENT DOCUMENTS

| | | |
|---|---|---|
| WO | 2004102623 A2 | 11/2004 |
| WO | 2005038920 A2 | 4/2005 |
| WO | 2007018856 A1 | 2/2007 |

OTHER PUBLICATIONS

WO 03/100831 Siamak Abedinpour, Integrated ZVS Synchronous Buck DC_DC Converter with Adaptive Control, World Intellectual Property Organization, Dec. 4, 2003.*

Abedinpour, S., "DC-DC Power Converter for Monolithic Implementation", *Department of Electrical Engineering and Computer Science*, (2000),2471-2471.

Abedinpour, Siamak, "Monolithic Distributed Power Supply for a Mixes-Signal Integrated Circuit", (2003),III-308-III-311.

Carley, L. R., "A Completely On-Chip Voltage Regulation Technique for Low Power Digital Circuits", 3 pages.

Hazucha, Peter, "A 233MHz, 80-87% Efficient, Integrated, 4-Phase DC-DC Converter in 90nm CMOS", *2004 Symposium on VLSI Circuits Digest Technical Papers*, (2004),256-257.

Kim, Jaeha, "Adaptive Supply Serial Links with Sub-1-V Operation and Per-Pin Clock Recovery", *IEEE Journal of Solid-State Circuits*, vol. 37, No. 11, (Nov. 2002),1403-1413.

PCT/US2006/026381 International Search Report and Written Opinion dated Dec. 4, 2006.

* cited by examiner

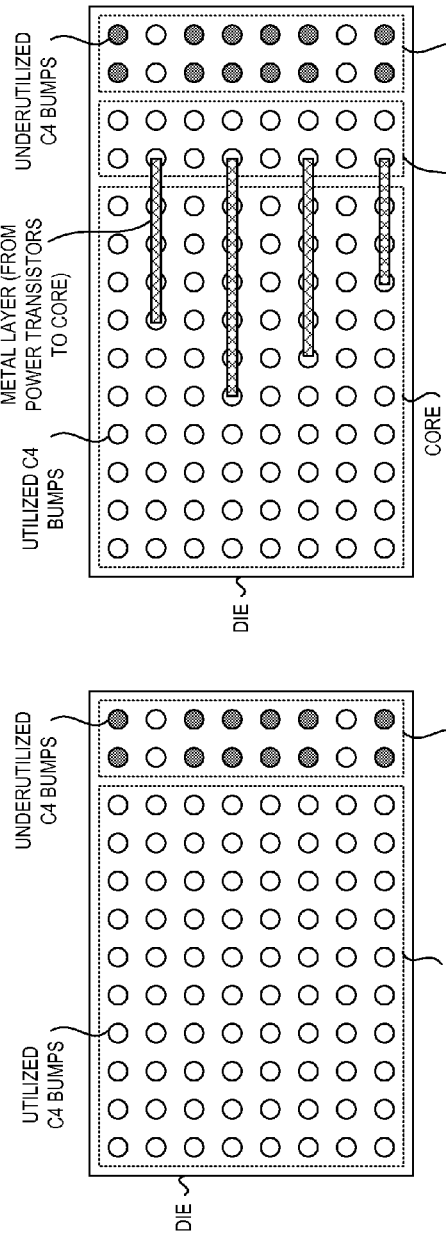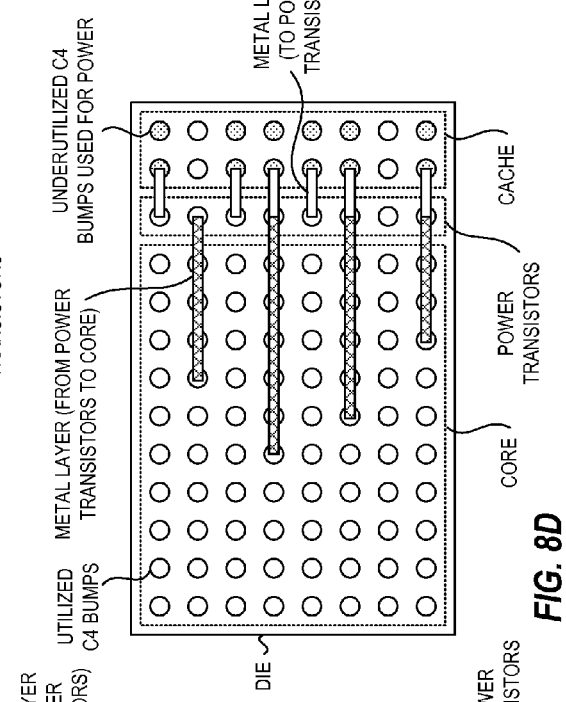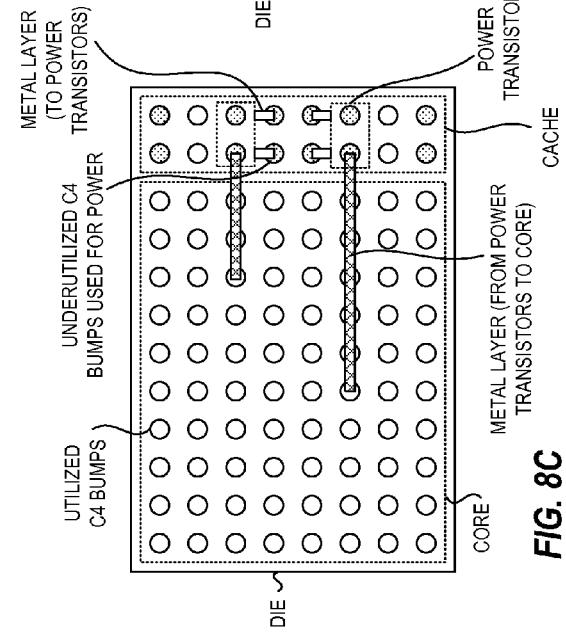

IC WITH FULLY INTEGRATED DC-TO-DC POWER CONVERTER

BACKGROUND

Growing demand for integrated circuits (ICs), for example microprocessors, with ever higher levels of performance and functionality have driven these devices to circuit densities beyond 100 million transistors per die. This number may soon exceed one billion transistors on a single die. The growth in transistor density has been made possible by the use of MOSFET transistors with gate lengths below 100 nm. As gate length has shortened, power supply voltages have fallen, in some cases, to below 1 V.

High-speed microprocessors, with clock speeds above 3 GHz, may require in excess of 100 watts of power when operating at maximum load. With operating voltages below 1 V, this translates to power supply currents that reach beyond 100 A. Additionally, the current requirements may change from idle (<20 A) to full power in a small number of clock cycles, leading to current transitions (di/dt) exceeding 30 GA/s.

Integrated circuits are typically powered from one or more DC supply voltages provided by external supplies and converters. The power is provided through pins, leads, lands, or bumps on the integrated circuit package. The traditional method for providing such high power to integrated circuits may involve the use of a high-efficiency, programmable DC-to-DC (switch-mode) power converter located near the IC package. This type of converter (buck regulator) may use a DC input voltage as high as 48 V and provide a DC output voltage below 2 V. Conventional DC-to-DC power converters use switching frequencies in the neighborhood of 200 KHz, with some high-end units in the 1-2 MHz range. Such converters usually require a handful of relatively large components, including a pulse-width modulation (PWM) controller, one or more power transistors, filter and decoupling capacitors, and one or more large inductors and/or transformers. These components are costly and require significant space on the printed circuit board in the neighborhood of the integrated circuit.

Another problem with having to provide currents in excess of 100 A and a di/dt above 30 GA/s to an integrated circuit is the need to use a significant number of input/output (I/O) pins on the integrated circuit package to feed power to the chip. For example, a 3.8 GHz Intel® Pentium® 4 microprocessor (from Intel Corporation of Santa Clara, Calif.) in a 775-land Land Grid Array package uses 226 power lands ($V_{CC}$) and 273 ground lands ($V_{SS}$) to support a maximum current of 119 A. This amounts to nearly ⅔ of all of the I/O lands dedicated to feeding power to the processor core.

BRIEF DESCRIPTION OF THE DRAWINGS

The features and advantages of the various embodiments will become apparent from the following detailed description in which:

FIGS. 8A-D illustrate an example integrated circuit die with the inclusion of power transistors, according to several embodiments.

DETAILED DESCRIPTION

Figure 1:
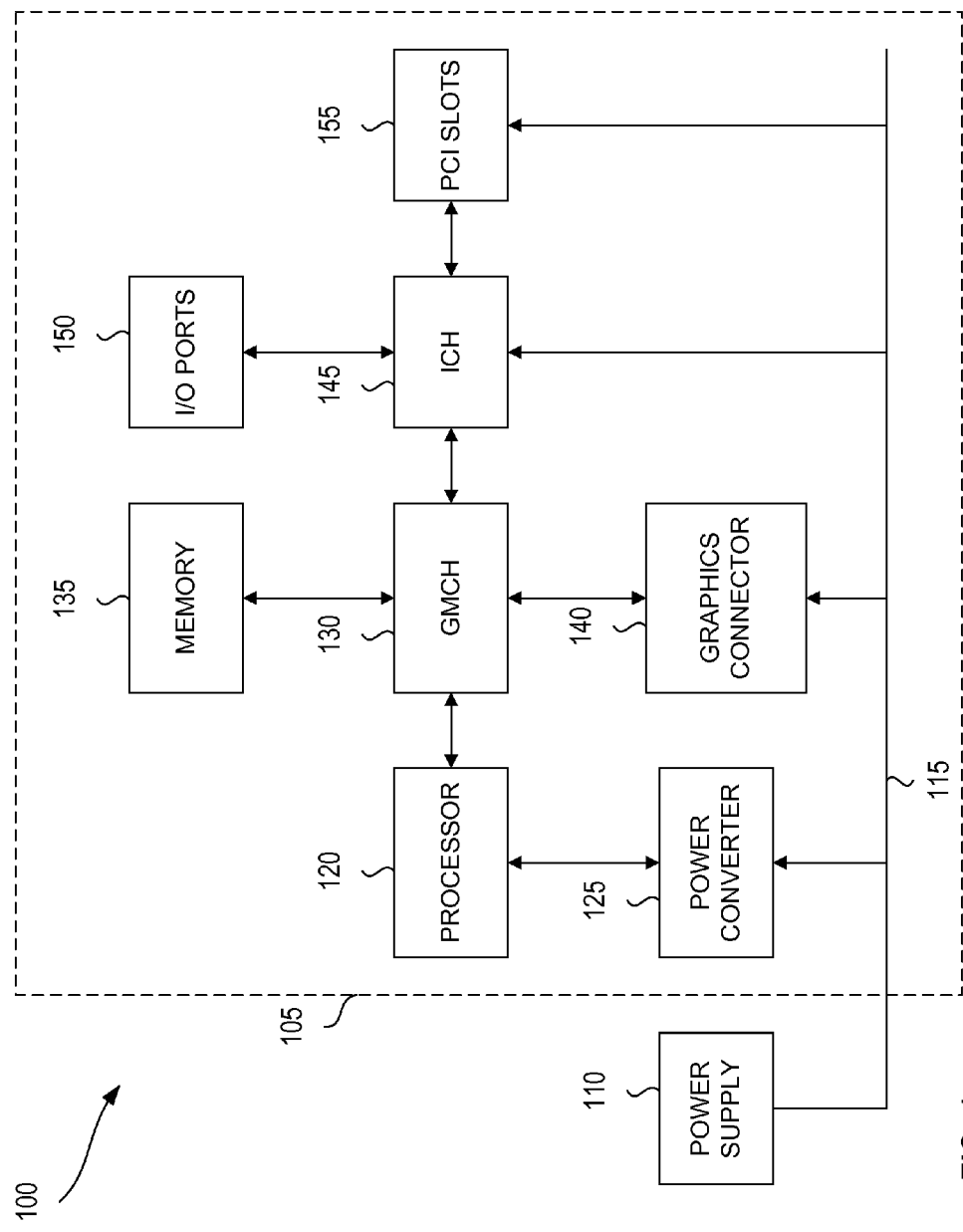
FIG. 1 illustrates an simplified system block diagram of a personal computer, according to one embodiment.

FIG. 1 is a simplified block diagram of an example embodiment of a processor-based computer system 100. The computer system 100 includes a motherboard 105 and a power supply 110. The motherboard 105 contains all of the core processing and interface components for the computer system 100. Other components typically used in the computer system 100, but not shown in FIG. 1, include a hard disk drive, optical disk drive (CD-ROM, DVD-ROM), network interface, video/graphics adapter, video monitor, and keyboard. The power supply 110 transforms AC input from a wall outlet or other primary supply to one or more DC voltages (illustrated as power bus 115) appropriate for use by the motherboard 105, as well as other components in computer system 100.

The motherboard 105 includes a processor 120 (sometimes called a Central Processing Unit (CPU)), a power converter 125, a graphics/memory controller hub (GMCH) 130, system memory 135, a graphics connector 140, an input/output (I/O) controller hub (ICH) 145, I/O ports 150, and Peripheral Component Interconnect bus (PCI) slots 155. The combination of the GMCH 130 and the ICH 145 are often referred to as a "PC Chip Set," or simply, "Chip Set". In one embodiment, the processor 120 is from the Intel® family of processors, including the Pentium® II, Pentium® III, Pentium® IV, and Itanium processors available from Intel Corporation of Santa Clara, Calif. In alternate embodiments, other processors may be used.

The GMCH 130 may include a memory controller that couples the system memory 135 to the processor 120. The system memory 135 stores data and program instructions that may be executed by processor 120. The system memory 135 may include dynamic random access memory (DRAM) or may be implemented using other memory types. The GMCH 130 may also include a high-speed video/graphics interface such as the Accelerated Graphics Port (AGP) or the PCI Express™ interface.

The ICH 145, coupled to the GMCH 130, provides an interface to most I/O devices within the computer system 100. The ICH 145 may be coupled to one or more I/O ports 150. The I/O ports 150 may include RS-232 serial ports, parallel ports, and Universal Serial Bus (USB) ports. The ICH 145 may also be coupled to one or more PCI slots 155. The ICH 145 provides a bridge from the processor 120 to peripheral equipment and peripheral cards (not shown) that may be connected to one or more I/O ports 150 or plugged into one or more PCI slots 155.

The processor 120 requires a core supply voltage that varies depending on the particular technology, speed, and other characteristics of the processor 120. To accommodate the needs of various processors, the power converter 125 (also referred to as a DC-to-DC converter or voltage regulator), converts one or more of the voltages from the power bus 115 to the voltage required for the particular processor 120.

Figure 2A:
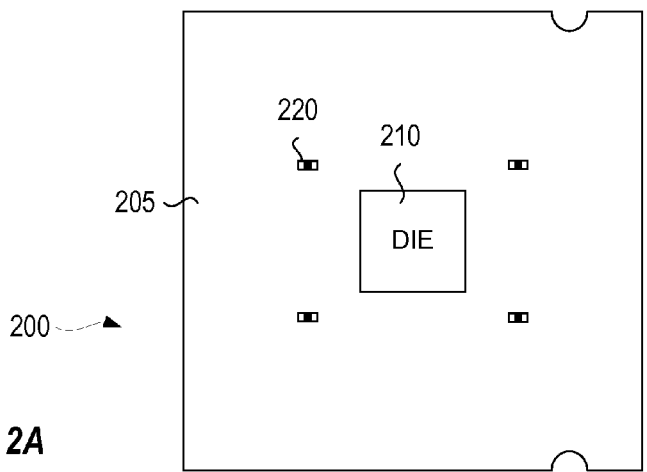
FIG. 2A illustrates a top view of an example integrated circuit, according to one embodiment.
Figure 2B:
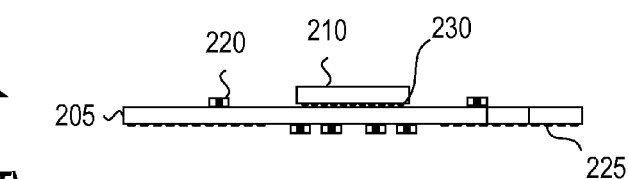
FIG. 2B illustrates an edge view of an example integrated circuit, according to one embodiment.
Figure 2C:
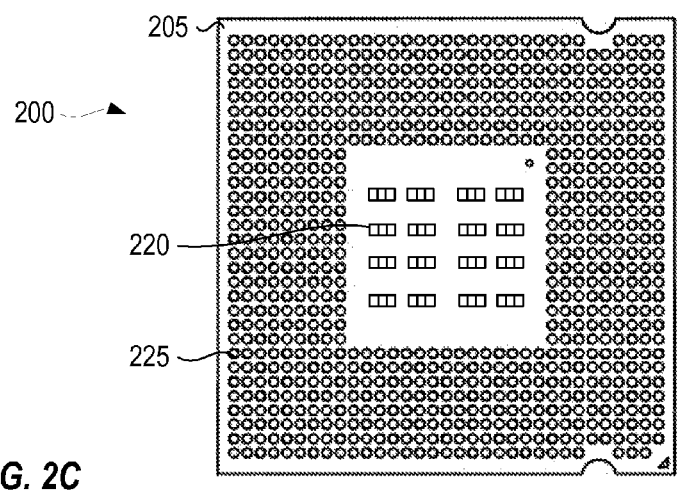
FIG. 2C illustrates a bottom view of an example integrated circuit, according to one embodiment.

FIGS. 2A-C illustrate several views of a typical integrated circuit 200 (for example, the processor 120 in FIG. 1). FIG. 2A illustrates an example of a top view of the integrated circuit 200, including a package substrate 205, a die 210, and one or more passive components 220 (capacitors, resistors, and/or inductors). The die 210 illustrated in FIG. 2A is of a type known as a "flip-chip". A flip-chip die has its contacts on the bottom face of the die and is surface mounted on the package substrate 205. In one embodiment, the die 210 has a large plurality of Controlled Collapse Chip Connection (C4) bumps. The C4 bumps are typically Lead/Tin (Pb/Sn) solder that has been evaporatively deposited or plated onto the die face. A die 210 with C4 bumps may be reflow soldered onto the package. In other embodiments, the die 210 may use wire-bond technology or Tape Automated Bonding (TAB) to connect the die 210 to the package substrate 205.

FIG. 2B illustrates an edge view of the integrated circuit 200 showing the package substrate 205, the die 210, the passive components 220, and the C4 bumps 230. FIG. 2C illustrates an example bottom view of the integrated circuit 200 showing the bottom of the package substrate 205, including a plurality of interconnections 225. The interconnections 225 provide a means for connecting electrical signals from the die 210 (not shown in FIG. 2C) to other electronic components (e.g., the power converter 125, the GMCH 130). FIG. 2C illustrates a "Land-Grid-Array" (LGA) package in which the interconnections 225 are "lands". An LGA package may be inserted into a socket mounted on a circuit board (for example, motherboard 105 in FIG. 1). In other embodiments, the interconnections 225 may be pins, bumps, or balls.

The package substrate 205 may provide connections between selected C4 bumps on the die 210 and selected interconnections 225. The package substrate 205 may provide connections between selected C4 bumps on the die 210 and additional components mounted on or contained within the package substrate 205. These additional components may include passive electronic devices such as capacitors 320, resistors (not shown), inductors (not shown), and transformers (not shown). The package substrate 205 may provide connections between selected C4 bumps on the die 210 and active surface-mounted components, such as transistors and other integrated circuits (not shown).

Figure 3A:
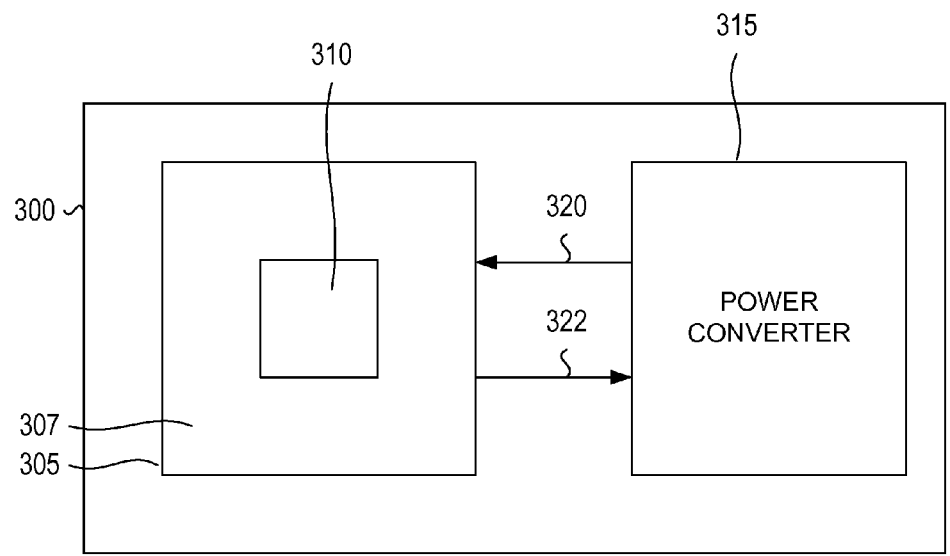
FIG. 3A illustrates an example integrated circuit with an external power converter, according to one embodiment.

FIG. 3A illustrates an example embodiment of an integrated circuit 300 with an external power converter. The circuit board 300 includes an integrated circuit 305 and a power converter 315. The integrated circuit 305 includes a package substrate 307 and die 310. The power converter 315 is implemented with discrete components mounted on the circuit board 300, external to the integrated circuit 305. The power converter 315 provides one or more supply voltages 320 to the integrated circuit 305. In some embodiments, the integrated circuit 305 may feed information 322, in the form of analog and/or digital signals to the power converter 315. The information 322 may be used by the power converter 315 to set one or more parameters (e.g., voltage levels of the supply voltages 320).

Figure 3B:
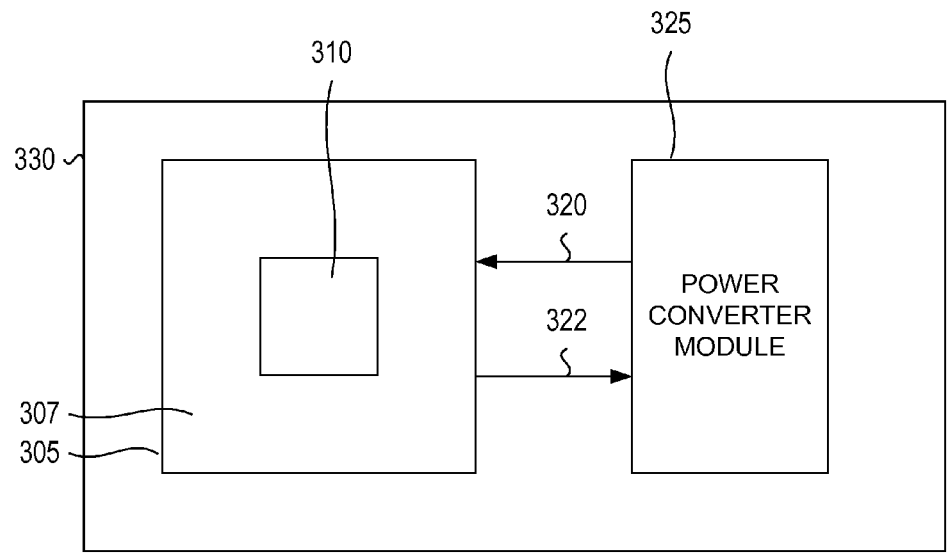
FIG. 3B illustrates an example integrated circuit with an external power converter, according to one embodiment.

FIG. 3B illustrates an example embodiment of an integrated circuit 330 with an external power converter. In this embodiment, the circuit board 330 includes the integrated circuit 305 (package substrate 307 and die 310) and a power converter module 325. The power converter module 325 is implemented on a separate circuit board or other substrate that is plugged into or solder mounted onto the circuit board 330. The power converter module 325 is external to the integrated circuit 305 and provides one or more supply voltages 320 to integrated circuit 305 and may receive information 322 from the integrated circuit 305.

Figure 4:
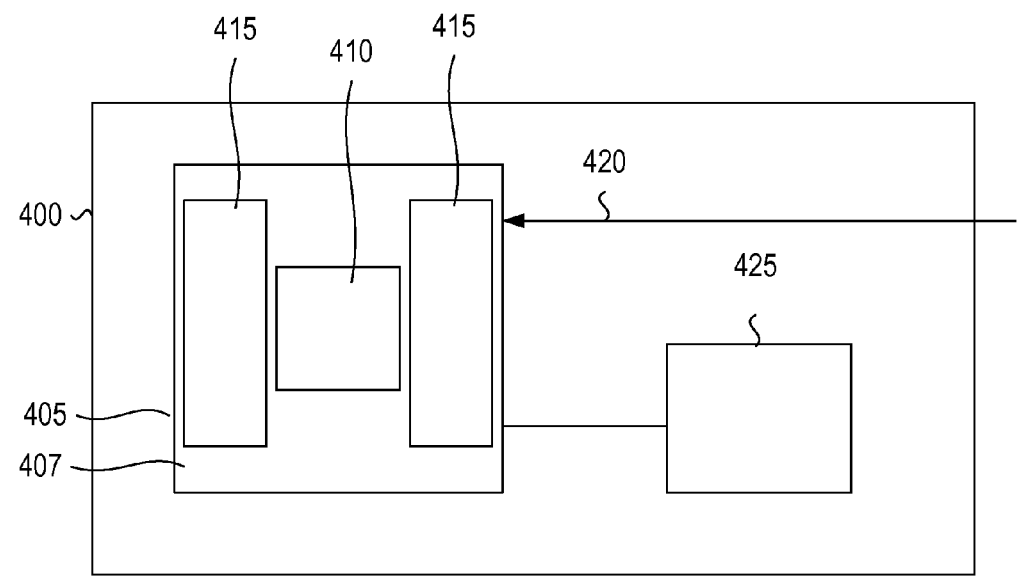
FIG. 4 illustrates an example integrated circuit with a power converter mounted on or within a package substrate, according to one embodiment.

FIG. 4 illustrates an example embodiment of a circuit board 400 containing an integrated circuit with a power converter mounted on or within a package substrate. The circuit board 400 includes an integrated circuit 405 and may include additional discrete components 425. The integrated circuit 405 includes package substrate 407, die 410, and power converter 415 (e.g., DC-to-DC switching converter). The power converter 415 may include one or more modulators (e.g., PWM, PFM), one or more power stages (e.g., bipolar transistors, MOSFETs), one or more capacitors, one or more resistors, one or more inductors, and one or more transformers. The power converter 415 may also include one or more controllers. Individual components making up the power converter 415 may be mounted on one of the surfaces of the package substrate 407, or may be formed by deposition on or inside the package substrate 407 (e.g., the package substrate 407 may comprise multiple layers). The power converter 415 may, in some embodiments, use the additional discrete components 425 mounted external to the integrated circuit 405. These components 425 may include, but are not limited to, capacitors, inductors, and transformers.

The power converter 415 may receive one or more source supply voltages 420 from an external power supply, voltage converter, or other power source (not shown). The power converter 415 may provide one or more supply voltages to the die 410. The die 410 may provide information (analog and/or digital signals) to the power converter 415 to set one or more parameters (e.g., supply voltage levels).

Figure 5:
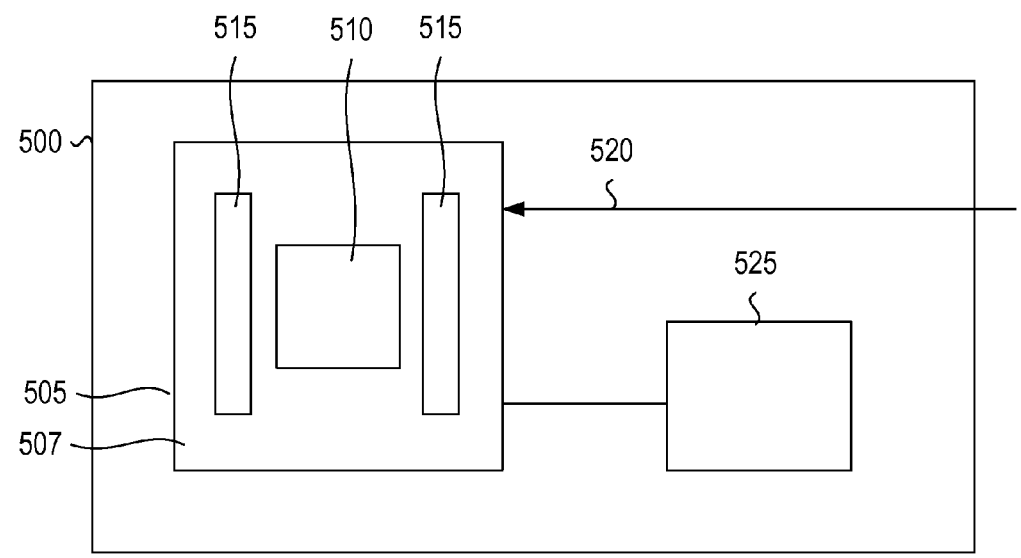
FIG. 5 illustrates an example integrated circuit with a power converter integrated on an integrated circuit die, according to one embodiment.

FIG. 5 illustrates an example embodiment of a circuit board 500 containing an integrated circuit with a power converter mounted on the integrated circuit die. The circuit board 500 includes an integrated circuit 505 and may include additional discrete components 525 (e.g., capacitors, inductors, transformers). The integrated circuit 505 includes a package substrate 507 and die 510, and may include additional components 515 on the package substrate 507. A DC-to-DC power converter (not illustrated) is fully integrated on the die 510. That is, all of the active components, and, optionally, all of the passive components, making up the DC-to-DC power converter are located on the die 510. The additional components 515 (e.g., capacitors) may be mounted on one of the surfaces of the package substrate 507, or may be formed by deposition on or inside the package substrate 507 (e.g., the package substrate 507 may comprise multiple layers). The power converter may, in some embodiments, use the additional discrete components 525 mounted external to the integrated circuit 505.

The integrated power converter on the die 510 may receive one or more source supply voltages 520 from an external power supply, voltage converter, or other power source (not shown).

Figure 6:
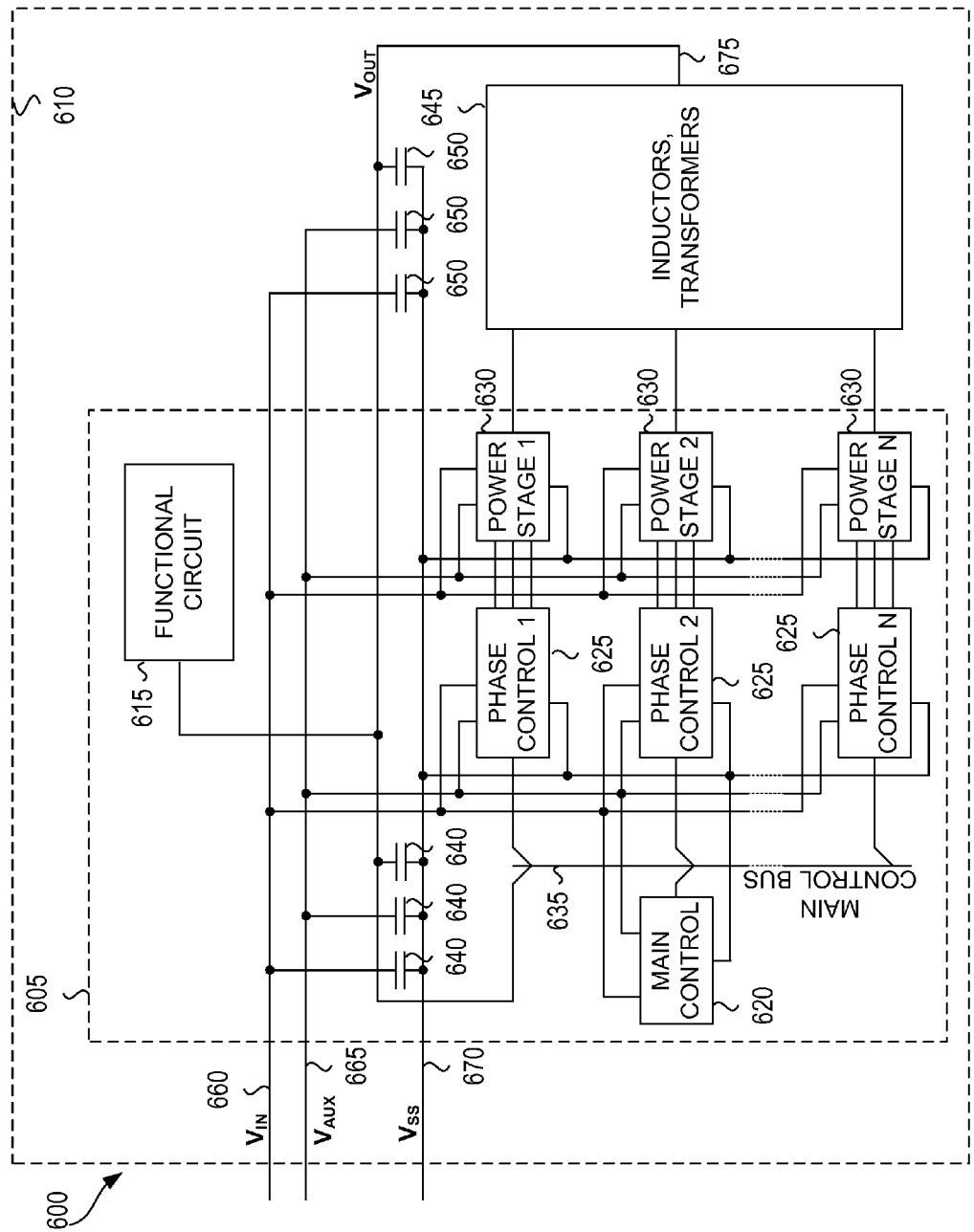
FIG. 6 illustrates an example power converter integrated on an integrated circuit die, according to one embodiment.

FIG. 6 illustrates an example embodiment of an integrated circuit 600 having a power converter integrated on an integrated circuit die. The integrated circuit 600 includes a package substrate 610 and die 605 located therewithin. The die 605 includes a functional circuit 615 and power converter circuitry. The functional circuit 615 performs the primary function of the integrated circuit 600 and may include any type of electronic circuitry, including analog, digital, or a combination of these. The functional circuit 615 may perform any type of function, including computation, signal processing, image processing, packet processing, and the like. In one embodiment, the functional circuit 615 is a microprocessor. In another embodiment, the functional circuit 615 is a network processor.

The power converter circuitry provides one or more supply voltages ($V_{OUT}$) 675 to the functional circuit 615. The power converter circuitry, in one embodiment, includes a main control 620, one or more phase controls 625, one or more power stages 630, a main control bus 635, and one or more filter/decoupling capacitors 640. One or more input voltage supplies ($V_{IN}$) 660 and auxiliary supplies ($V_{AUX}$) 665 supply current to the power converter circuitry on the die 605. A ground return is provided by a $V_{SS}$ line 670. As illustrated, passive components (e.g., inductors, transformers) 645 and capacitors 650 that make up part of the power converter circuitry are located on the package substrate 610. These components are mounted or deposited on or inside the package substrate 610.

As illustrated, the power converter is a multiphase power converter as it includes N phases (N phase controls 625 and N power stages 630). Multiphase power converters may provide higher power output, faster response to changes in load, and lower output ripple. Multiphase power converters may have as few as two phases and as many as several hundred phases. However, the various embodiments described herein are not limited to multiphase power converters. Rather, a single phase power converter (one phase control 625 and one power stage 630) may be used without departing from the scope.

Figure 7:
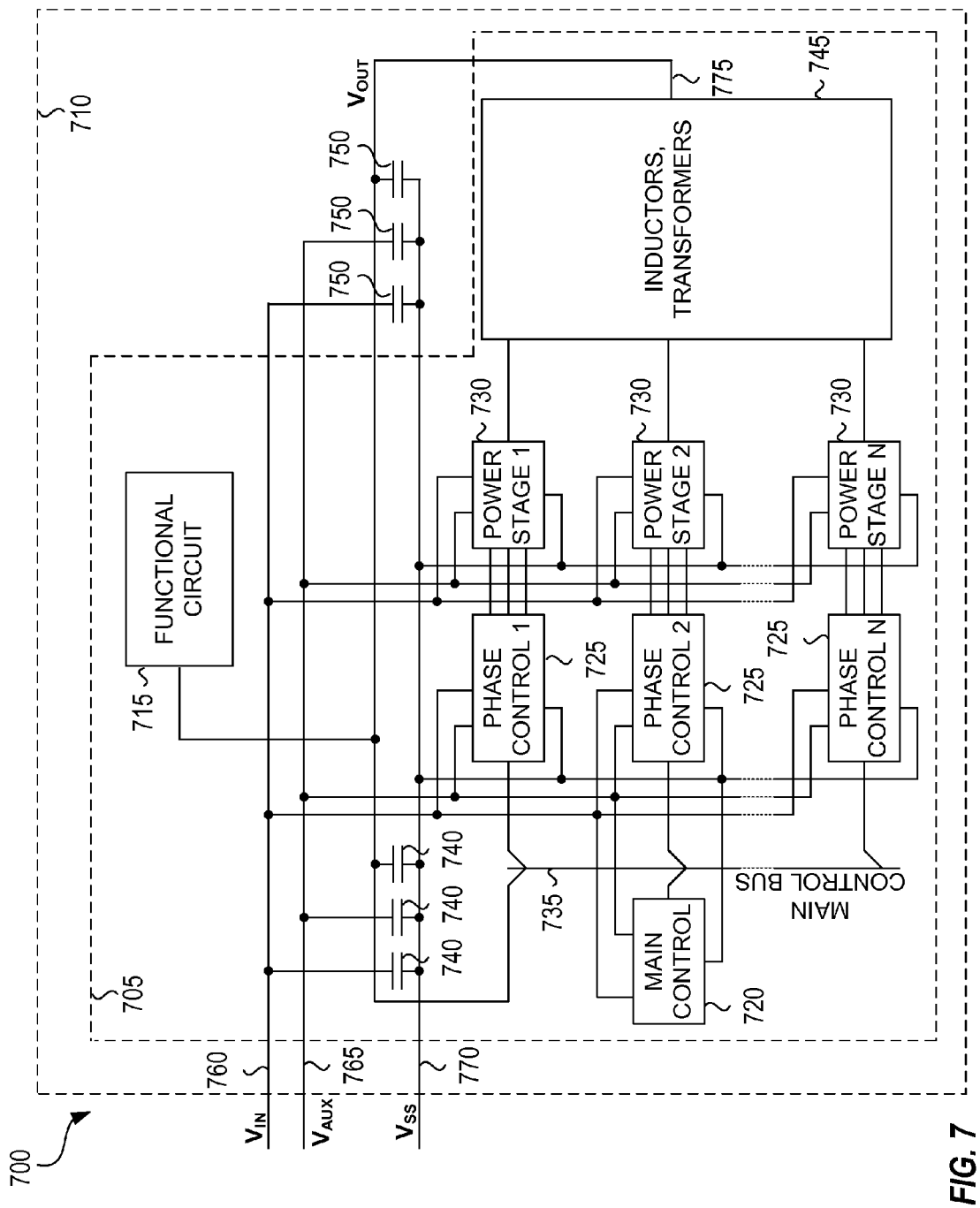
FIG. 7 illustrates another example power converter integrated on an integrated circuit die, according to one embodiment.

FIG. 7 illustrates an example embodiment of an integrated circuit 700 having a power converter integrated on an integrated circuit die. The integrated circuit 700 includes a package substrate 710 and die 705 located therewithin. The die 705 includes a functional circuit 715 and power converter circuitry. The functional circuit 715 performs the primary function of integrated circuit 700. As described above with respect to the embodiment of FIG. 6 the functional circuit 715 may include any type of electronic circuitry.

The power converter circuitry provides one or more supply voltages ($V_{OUT}$) 775 to the functional circuit 715. The power converter circuitry may include a main control 720, one or more phase controls 725, one or more power stages 730, a main control bus 735, one or more filter/decoupling capacitors 740, and inductors and/or transformers 745. Additional passive components, such as capacitors 750 may be mounted or deposited on the package substrate 710.

One or more input voltage supplies ($V_{IN}$) 760 and auxiliary supplies ($V_{AUX}$) 765 supply current to the power converter circuitry on the die 705. A ground return is provided by a $V_{SS}$ line 770. As discussed above with reference to the embodiment illustrated in FIG. 6, the power converter of FIG. 7 may include one or more phases (phase control 725 and power stage 730).

In the embodiments illustrated in FIGS. 4-7, the use of high frequency switching circuitry allows for the miniaturization of the power converter components. For example, at switching frequencies above 10 MHz, and preferably above 50 MHz, the discrete components become small enough to fit entirely on the package substrate, or, preferably, on the die itself. The high frequency switching circuitry described with respect to FIGS. 4-7 may be used on very large scale integration (VLSI) chips. For example, the integrated dc-to-dc switching converters may be utilized on chips having over one million transistors. The dc-to-dc switching converters may be integrated on computer/central processing unit (CPU) chips.

In some embodiments, multiple power converters (e.g., 600, 700) may be present, with each power converter providing power to a segment of the functional circuit. Each power converter may be tailored to optimize powering of an associated segment of the functional circuit. For example, in one embodiment, each power converter may have a different number of phases, where the number of phases may be selected to match the particular demand of the functional circuit segment.

In one embodiment, a power stage (e.g., 630 in FIG. 6, 730 in FIG. 7) includes power transistors (e.g., MOSFETs) that are fabricated on the same die as the functional circuit. At frequencies above 50 MHz, the power stage transistors have low capacitance and low resistance to provide acceptable power conversion efficiency. By limiting the voltage seen by the power transistors, the standard transistors offered on same process used to build the functional circuit may be used. These transistors may, in some embodiments, be located on the edge of the functional circuit (see FIGS. 8B-8D). Interconnection of the power transistors to the remaining die requires a significant use of power resources. On some integrated circuits there is an abundance of underutilized C4 (Controlled Collapse Chip Connection) bumps (see FIGS. 8A-D).

For example, on a microprocessor die the power density of the cache memory is only about 2% of the power density of the processor core which translates into significant availability of C4 bumps over the cache area (see FIGS. 8A-D). In one embodiment, the power stage transistors may use these underutilized C4 bumps over the cache memory area to carry the large currents required (see FIGS. 8C-8D). These cache bumps may be used to couple the supply current to the die. A thick on-die metal layer (~10 um) may be employed to move this current laterally across the cache to the location of the power stage transistors (see FIG. 8D). It may also use the thick metal to laterally distribute cache current, and to distribute the gated current away from the power stage transistors and towards the core (see FIGS. 8B-D). In another embodiment, power stage transistors may be distributed throughout the functional circuit.

In one embodiment, the power converter circuitry may use one or more control parameters from the functional circuit to enhance the performance, accuracy, and efficiency of the power converter and the functional circuit. Examples of such parameters include functional circuit supply voltage, functional circuit supply current, functional circuit operating temperature, functional circuit activity (including counters, clock enable states, etc.), functional circuit oscillator frequency, and functional circuit power-states. The control parameters may be fed to a main control (e.g., 620 in FIG. 6, 720 in FIG. 7) and phase control modules (e.g., 630 in FIG. 6, 730 in FIG. 7) of the power converter to alter the operation of the power converter.

According to one embodiment, an adaptive noise guard band may be implemented in the power converter. When parts of the functional circuit are powered down or run at a lower power active state to save power, less noise is generated. Accordingly, the power converter noise guard band may be reduced. Variations in functional activity of the functional circuit is a source of self induced noise and may also be used in a similar manner to alter the noise guard band. In some embodiments, functional activity may be used as a predictor of future current demands and voltage drops. In these embodiments, functional activity can be used by the power converter to begin a corrective action prior to noise actually occurring.

According to one embodiment, the temperature of the functional circuit may be used to increase or reduce the supply voltage to the functional circuit. For example, a microprocessor needs less voltage for a given speed at lower temperatures.

According to one embodiment, circuit power and reliability may be traded off for increased operating frequency by raising the supply voltage to the functional circuit.

The embodiments described above can be used on both programmable and non-programmable integrated circuits. The integrated circuits utilizing the various embodiments may be used in different systems and in multiple environments. For example, the various embodiments described herein could be part of a computer or could be part of highspeed telecommunications equipment (e.g., store-and-forward devices). If an integrated circuit utilizing the various embodiments discussed herewithin was part of a computer the integrated circuit may contain memory on the die, separate off die memory may be included, or memory may be provided both on and off die. If an integrated circuit utilizing the various embodiments discussed herewithin was part of a store-and-forward device the integrated circuit may be located on a telecommunications board contained therewithin. The telecommunications boards may be Ethernet (e.g., Gigabit, 10 Base T), ATM, Fibre channel, Synchronous Optical Network (SONET), and Synchronous Digital Hierarchy (SDH), amongst others.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" or "in an embodiment" appearing in various places throughout the specification are not necessarily all referring to the same embodiment.

Different implementations may feature different combinations of hardware, firmware, and/or software. It may be possible to implement, for example, some or all components of various embodiments in software and/or firmware as well as hardware, as known in the art. Embodiments may be implemented in numerous types of hardware, software and firmware known in the art, for example, integrated circuits, including ASICs and other types known in the art, printed circuit broads, components, etc.

The various embodiments are intended to be protected broadly within the spirit and scope of the appended claims.

What is claimed:

1. An apparatus comprising:
a functional circuit formed in a semiconductor die; and
a dc-to-dc switching power converter coupled to said functional circuit, to convert, regulate, and filter a DC input voltage to produce a DC output voltage and provide the DC output voltage to the functional circuit, wherein the dc-to-dc power converter has a switching frequency above 10 MHz, wherein the dc-to-dc switching power converter includes a main control circuit, a plurality of phase control circuits electrically coupled to the main control circuit, and a plurality of power stage transistors coupled to the plurality of phase control circuits, wherein the main control circuit, the plurality of phase control circuits, and the plurality of power stage transistors are formed in the semiconductor die, wherein power for the plurality of power stage transistors is to be provided via underutilized die interconnect elements on the semiconductor die, wherein the underutilized die interconnect elements are within cache memory formed in the semiconductor die and are not required to provide power or signals to the cache memory, and wherein at least a portion of the plurality of power stage transistors are formed within the cache memory.

2. The apparatus of claim 1, wherein the dc-to-dc switching power converter further includes one or more inductors electrically coupled to the one or more power stage transistors.

3. The apparatus of claim 2, wherein the dc-to-dc switching power converter further includes one or more capacitors electrically coupled to the one or more inductors.

4. The apparatus of claim 2, wherein the one or more inductors are formed on a package substrate.

5. The apparatus of claim 1, wherein the functional circuit provides two or more control parameters to the dc-to-dc switching power converter.

6. The apparatus of claim 5, wherein the two or more control parameters includes one or more of: a functional circuit supply voltage, a functional circuit supply current, a functional circuit operating temperature, a functional circuit activity, a functional circuit oscillator frequency, and a functional circuit power-state.

7. The apparatus of claim 1, wherein said functional circuit is a microprocessor.

8. The apparatus of claim 1, wherein the semiconductor die includes more than one million transistors.

9. The apparatus of claim 1, wherein the die interconnect elements are Controlled Collapse Chip Connected (C4) bumps.

10. An apparatus comprising:
a functional circuit formed in a semiconductor die; and
a dc-to-dc switching power converter coupled to said functional circuit, to convert, regulate, and filter a DC input voltage to produce a DC output voltage and provide the DC output voltage to the functional circuit, wherein the dc-to-dc power converter has a switching frequency above 10 MHz, wherein the dc-to-dc switching power converter includes a main control circuit, a plurality of phase control circuits electrically coupled to the main control circuit, and a plurality of power stage transistors coupled to the plurality of phase control circuits, wherein the main control circuit, the plurality of phase control circuits, and the plurality of power stage transistors are formed in the semiconductor die, wherein power for the plurality of power stage transistors is to be provided via underutilized die interconnect elements on the semiconductor die, wherein the underutilized die interconnect elements are die interconnect elements that are not required to provide power or signals to the circuitry formed in that portion of the semiconductor die, wherein the underutilized die interconnect elements are within cache memory formed in the semiconductor die.

11. The apparatus of claim 10, wherein at least a portion of the plurality of power stage transistors are formed within the cache memory.

12. An apparatus comprising:
a functional circuit formed in a semiconductor die;
a dc-to-dc switching power converter coupled to said functional circuit, to convert, regulate, and filter a DC input voltage to produce a DC output voltage and provide the DC output voltage to the functional circuit, wherein the dc-to-dc power converter has a switching frequency above 10 MHz, wherein the dc-to-dc switching power converter includes a main control circuit, a plurality of phase control circuits electrically coupled to the main control circuit, and a plurality of power stage transistors coupled to the plurality of phase control circuits, wherein the main control circuit, the plurality of phase control circuits, and the plurality of power stage transistors are formed in the semiconductor die, wherein power for the plurality of power stage transistors is to be provided via underutilized die interconnect elements on the semiconductor die, wherein the underutilized die interconnect elements are die interconnect elements that are not required to provide power or signals to the circuitry formed in that portion of the semiconductor die; and
on die metal layers to distribute the power over the semiconductor die to the plurality of power stage transistors.

* * * * *